(12) United States Patent
Brock

(10) Patent No.: US 8,300,549 B2
(45) Date of Patent: Oct. 30, 2012

(54) GATEWAY CONFIGURATION UPDATING

(75) Inventor: Brett Anwar Brock, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 226 days.

(21) Appl. No.: 12/815,608

(22) Filed: Jun. 15, 2010

(65) Prior Publication Data

US 2011/0305244 A1    Dec. 15, 2011

(51) Int. Cl.
*H04L 12/28* (2006.01)

(52) U.S. Cl. ........ 370/252; 370/254; 370/400; 370/401; 370/410; 700/223; 700/224; 700/226; 700/244

(58) Field of Classification Search .................. 370/252, 370/254, 400, 401, 410; 709/244, 223, 224, 709/226

See application file for complete search history.

(56) References Cited

U.S. PATENT DOCUMENTS

| | | | |
|---|---|---|---|
| 7,007,003 B1* | 2/2006 | Rybicki | 707/613 |
| 7,283,519 B2* | 10/2007 | Girard | 370/353 |
| 7,334,252 B1* | 2/2008 | Millet et al. | 725/111 |
| 2004/0042600 A1* | 3/2004 | Tripathi et al. | 379/201.12 |
| 2007/0074240 A1* | 3/2007 | Addington et al. | 725/25 |
| 2007/0121514 A1* | 5/2007 | Goldstein et al. | 370/236 |
| 2010/0054316 A1* | 3/2010 | Mishra et al. | 375/224 |

* cited by examiner

*Primary Examiner* — Man Phan
*Assistant Examiner* — Robert M Morlan
(74) *Attorney, Agent, or Firm* — Merchant & Gould

(57) ABSTRACT

The configuration of a gateway in a communications network may be updated. Provisioning data may be extracted from a gateway management server. The extracted provisioning data may be filtered against a list of target gateways. Upon determining an equipping status of endpoints associated with the target gateways in the list, the configuration of one or more target gateways may be updated utilizing existing endpoint provisioning associated with the one or more target gateways.

12 Claims, 6 Drawing Sheets

_US 8,300,549 B2_

GATEWAY CONFIGURATION UPDATING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Gateway controllers may be utilized in communication networks to manage gateways which provide various services to subscribing customers. For example, a gateway may include an embedded multimedia terminal adapter ("EMTA") so that a subscriber may use Voice over Internet Protocol ("VoIP") service to make and receive telephone calls over a cable services network using an assigned directory number (i.e., telephone number). The management functions of gateway controllers include provisioning functions for updating the configuration (i.e., site and/or controller associations) of existing gateways. Current gateway controller provisioning functions include disassociating and then re-associating a gateway during the provisioning process. The disassociation of a gateway however, results in the directory number as well as other endpoint provisioning for the gateway being de-provisioned (i.e., erased). It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for updating the configuration of a gateway in a communications network. Provisioning data may be extracted from a gateway management server. The extracted provisioning data may be filtered against a list of target gateways. Upon determining an equipping status of endpoints associated with the target gateways in the list, the configuration of one or more target gateways may be updated utilizing existing endpoint provisioning associated with the one or more target gateways.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for updating the configuration of a gateway in a communications network. Provisioning data may be extracted from a gateway management server. The extracted provisioning data may be filtered against a list of target gateways. Upon determining an equipping status of endpoints associated with the target gateways in the list, the configuration of one or more target gateways may be updated utilizing existing endpoint provisioning associated with the one or more target gateways.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
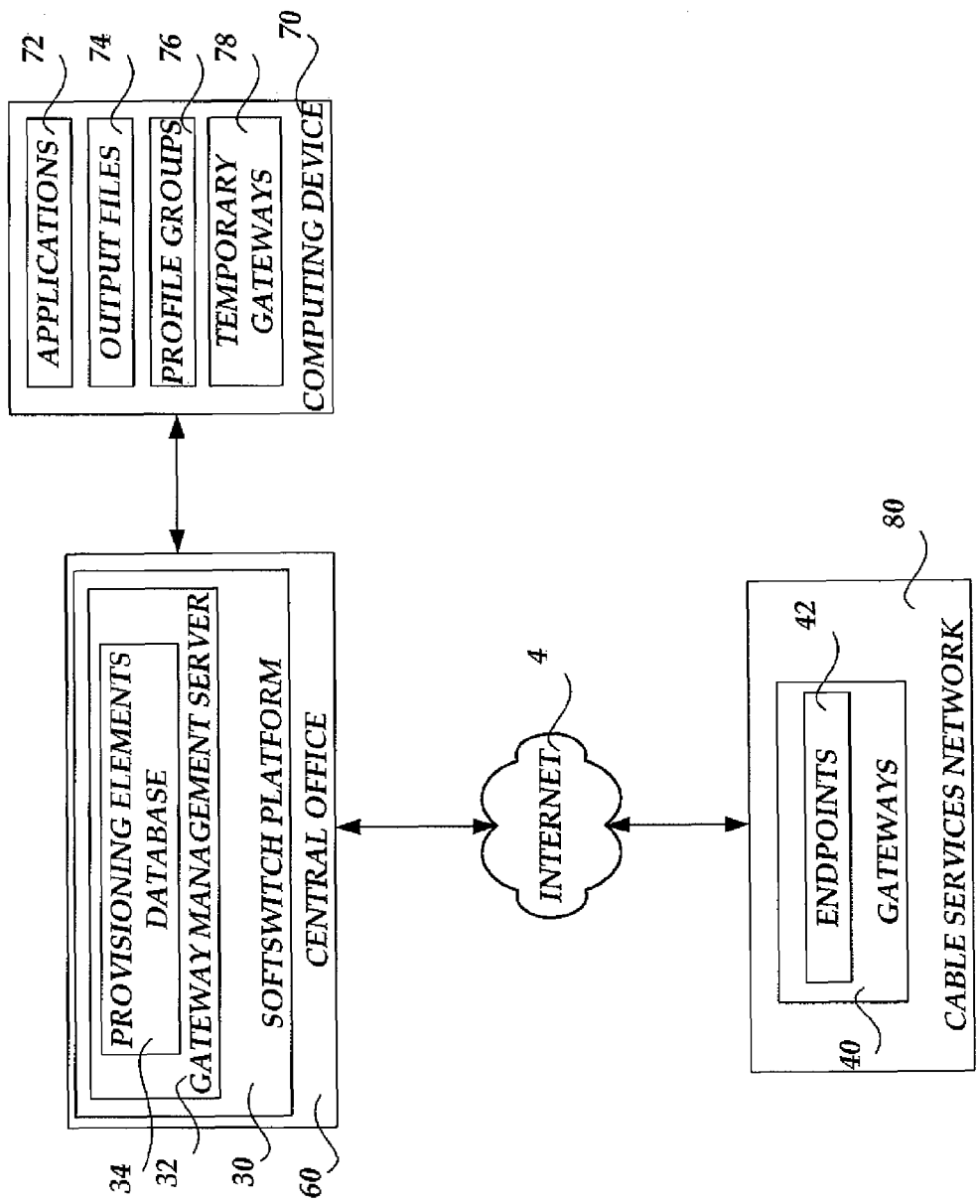
FIG. 1 is a block diagram illustrating a network architecture for updating the configuration of one or more gateways, in accordance with various embodiments.

Referring now to the drawings, in which like numerals represent like elements through the several figures, various aspects of the present invention will be described. FIG. 1 is a block diagram illustrating a network architecture which may be utilized for updating the configuration of one or more gateways coordinating content from multiple data sources, in accordance with various embodiments. The network architecture includes a central office 60 in communication with a computing device 70. The central office 60 may also be in communication with a cable services network 80 over the Internet 4.

The central office 60 may comprise a softswitch platform 30. The softswitch platform 30 may comprise a gateway management server 32. The gateway management server 32 may comprise a provisioning elements database 34. In accordance with an embodiment, the softswitch platform 30 may comprise the COMMUNICATION SERVER ("CS2K") softswitch manufactured by NORTEL NETWORKS of Toronto, Ontario. As should be known by those skilled in the art, the CS2K is an Internet Protocol Multimedia Subsystem ("IMS") carrier grade softswitch for operation in an open standards Voice over IP ("VoIP") network. The CS2K supports a wide range of signaling, transport and control protocols including both the Media Gateway Control Protocol ("MGCP") and the Session Initiated Protocol ("SIP") for line gateways. As defined herein, a gateway may comprise various types of customer premises equipment for sending and receiving Voice over Internet Protocol ("VoIP") call data over the Internet 4. In accordance with an embodiment, a gateway may comprise an embedded multimedia terminal adapter ("EMTA") which incorporates a cable modem and a VoIP adapter into a single device for sending and receiving VoIP calls in a cable services network. In accordance with another embodiment, a gateway may comprise a cable modem and a separate VoIP adapter (e.g., an analog telephone adapter ("ATA"). In accordance with either of the aforementioned embodiments, a gateway may further comprise a number of endpoints (e.g., communication ports) to which directory (i.e., telephone) numbers may be assigned. An endpoint which has been assigned a directory number (i.e., by the softswitch platform 30) is known as an "equipped" endpoint while an endpoint which has not been assigned a directory number is known as an "unequipped" endpoint. It should be understood that the embodiments described herein should not be construed as being limited to the aforementioned softswitch platform 30 and that other communications technology from other developers and/or manufacturers may also be utilized. In addition, the aforementioned gateway is not limited to an EMTA, a cable modem, or a cable services network, but may also comprise any other device capable of communicating VoIP data over a wide area network such as a digital subscriber line ("DSL") device, a broadband mobile phone network device, or other devices know to those skilled in the art. The gateway management server 32 may comprise a management tool server (e.g., a CS2K management tool server) which stores provisioning element data in the provisioning elements database 34. The provisioning elements database 34 may include data utilized in the configuration of a gateway. The provisioning elements database 34 will be discussed in greater detail below with respect to FIG. 2.

The computing device 70 may comprise a server computer which stores applications 72, output files 74, logical groups 76, and temporary gateways 78. In accordance with various embodiments, the applications 72 may comprise software controller and maintenance tools which allow for the updating of a gateway configuration without disturbing feature and line provisioning that exists within the central office 60 and the softswitch platform 30 (i.e., a core call processing operating system and database). In particular, the applications 72 may comprise a number of script files. In accordance with an embodiment, a first script file in the applications 72 may be configured to extract gateway provisioning data from the provisioning elements database 34 thereby producing the output files 74. For example, a script file entitled "cs2kDataCollector.pl" may be utilized to extract the gateway provisioning data and produce the output files 74. The applications 72 may also comprise a second script file configured to read the gateway provisioning data of the first script file (i.e., the output files 74) and filter the data using a list of target gateways. As will be described in greater detail below with respect to FIG. 3, the list of target gateways may comprise gateways in the cable services network 80 designated for configuration updating by a user of the applications 72. For target gateways that are present in the gateway provisioning data (i.e., the first script file), the second script file may further be configured to extract the number of endpoints for each gateway, query the softswitch platform 30 for an equipped status of each endpoint, and record the results. In accordance with an embodiment, the second script file may be configured to query a CS2K softswitch through a machine provisioning interface. In accordance with an embodiment, the machine provisioning interface may comprise "OSSGate." As should be understood by those skilled in the art, OSSGate is a machine provisioning interface for Internet Protocol components. The second script file may further be configured to identify the equipped and unequipped endpoints and label them accordingly. Target gateways which are not found in the gateway provisioning data (i.e., the provisioning elements database 34) are marked as invalid. In accordance with an embodiment, a script file entitled "Cs2kDataCollector.pl" may be utilized to read the gateway provisioning output of the "GetGatewayProvisioning.pl" script file. The applications 72 may also comprise a third script file configured to read the gateway provisioning data and the target gateway list. Valid target gateways (i.e., gateways having endpoints labeled as equipped) are grouped based on a profile type and current provisioning values associated with the target gateways are recorded. In accordance with an embodiment, one or more target gateways may be associated with one of the logical groups 76 stored on the computing device 70. It should be understood that a profile type may define profile attributes specific to a given gateway. Illustrative profile attributes will be described in greater detail below with respect to FIG. 2. The third script file may further be configured to execute a series of commands to execute changes to the provisioning of target gateways in an ordered sequence. The series of commands may include provisioning one or more of the temporary gateways 78 (as software code) as a means to execute changes to the provisioning of the target gateways without disturbing feature and line provisioning that exists within the central office 60 and the softswitch platform 30 (i.e., a core call processing operating system and database). The series of commands will be described in greater detail below with respect to FIGS. 4-5. In accordance with an embodiment, a script file entitled "Cs2kManager.pl" may be utilized to read the gateway provisioning data and the target gateway list, as well to execute the series of commands to execute changes to the provisioning of target gateways.

The cable services network 80 may comprise a conventional cable services network including a Hybrid Fiber Coax ("HFC") network which may be utilized by one or gateways 40 to communicate VoIP data (e.g., send and receive VoIP telephone calls) over the Internet 4. As discussed above, the gateways 40 may comprise, without limitation, EMTAs and/or cable modems coupled to VoIP adapters. The gateways 40 may also include endpoints 42 which, as described above, are communication ports on the gateways 40 to which directory (i.e., telephone) numbers may be assigned.

Figure 2:
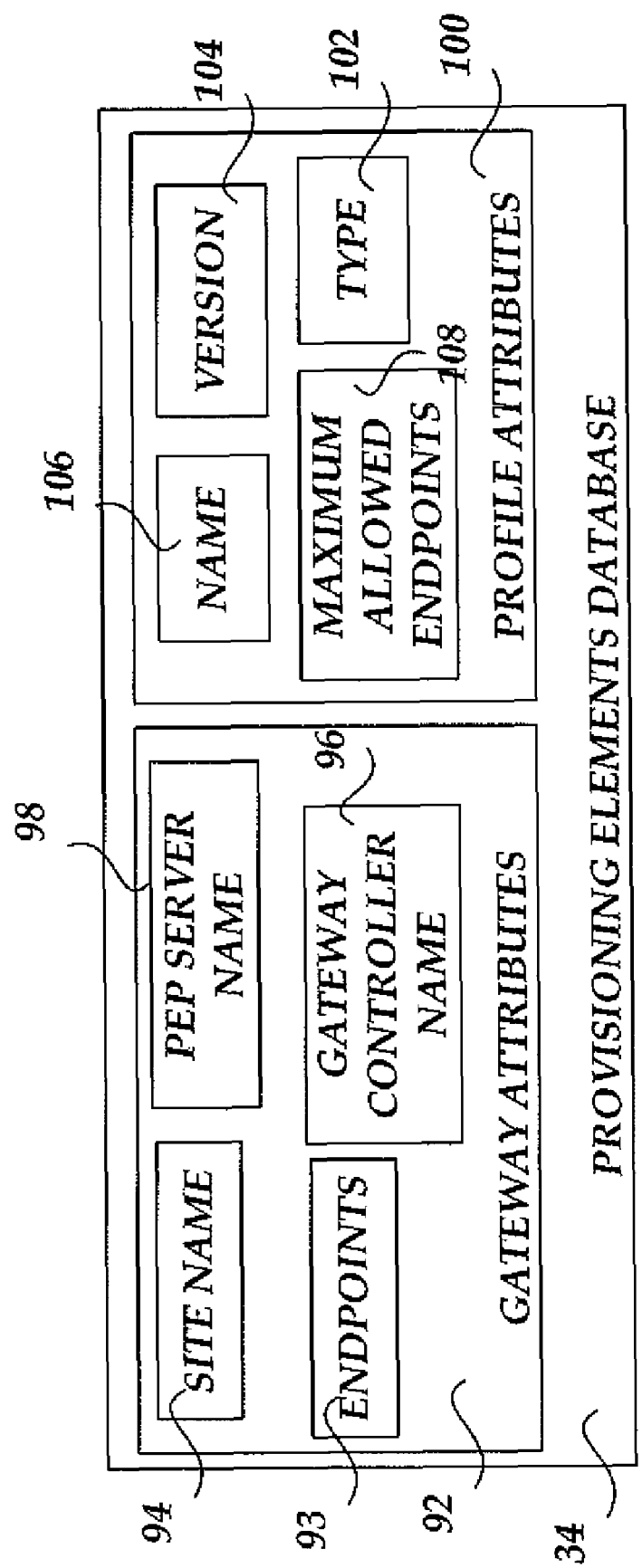
FIG. 2 is a block diagram illustrating a provisioning elements database in the network architecture of FIG. 1, in accordance with various embodiments.

FIG. 2 is a block diagram illustrating the provisioning elements database 34 in the network architecture of FIG. 1, in accordance with various embodiments. The provisioning elements database 34 may comprise gateway attributes 92 and profile attributes 100. The gateway attributes 92 may include Endpoints 93, a Site Name 94, a Gateway Controller Name 96 and a Policy Enforcement Point ("PEP") server name 98. The Site Name 94 may be utilized to identify the entry in a table site that a gateway must be associated with and provides the basis for the logical group selection and/or creation for a gateway controller. The Gateway Controller Name 96 may be utilized to hold a serving gateway controller for a gateway. The PEP server name 98 may be utilized to identify a network element utilized to setup service flows (e.g., VoIP service) in the HFC network of the cable services network 80. The profile attributes 100 may comprise Type 102, Version 104, Name 106, and maximum allowed endpoints 108. It should be appreciated that the profile attributes 100 may comprise a set of enumerated lists and bound ranges that define profile attributes specific to a given gateway. The Type 102 may be utilized to define a protocol type used by a gateway such as, for example, the Network-based Call Signaling ("NCS") protocol or the H.248 protocol (which is an implementation of the Media Gateway Control Protocol architecture. It should be understood that the protocol type utilized with a given gateway may be a matter of selecting a desired protocol from a predefined list. The Version 104 may be utilized to specify the version of the protocols identified in the Type 102. The Name 106 may be utilized to specify a name for a media gateway selected from a predefined list. The maximum allowed endpoints 108 may be utilized to specify the number of endpoints for a gateway.

Figure 3:
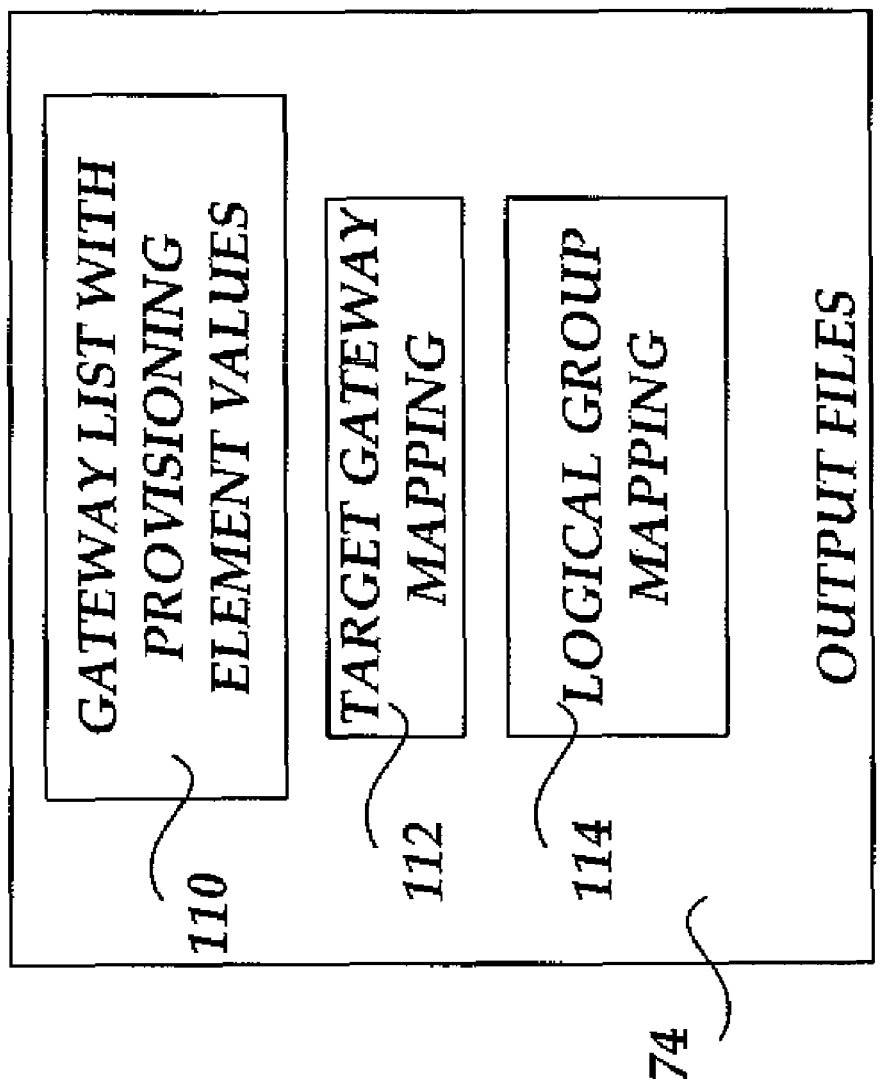
FIG. 3 is a block diagram illustrating the contents of output files generated by a computing device in the network architecture of FIG. 1, in accordance with various embodiments.

FIG. 3 is a block diagram illustrating the contents of the output files 74 generated by the applications 72 (e.g., the first script file in the applications 72) executing on the computing device 70 in the network architecture of FIG. 1, in accordance with various embodiments. The output files 74 may include a gateway list with provisioning element values file 110, a target gateway mapping file 112 and a logical group mapping file 114. The gateway list with provisioning element values file 110 may include data comprising a listing of all gateways (regardless of type) and the provisioning element values used to provision each gateway. The provisioning element values may consist of values explicitly defined by a user and those generated by OSSGate. The target gateway mapping file 112 may include data comprising a mapping of a target gateway to an assigned logical group. For example, a target gateway endpoint may be mapped to a directory number. The logical group mapping file 114 may include data comprising a mapping of logical groups to a serving gateway controller (i.e., a gateway controller to logical group mapping).

Figure 4:
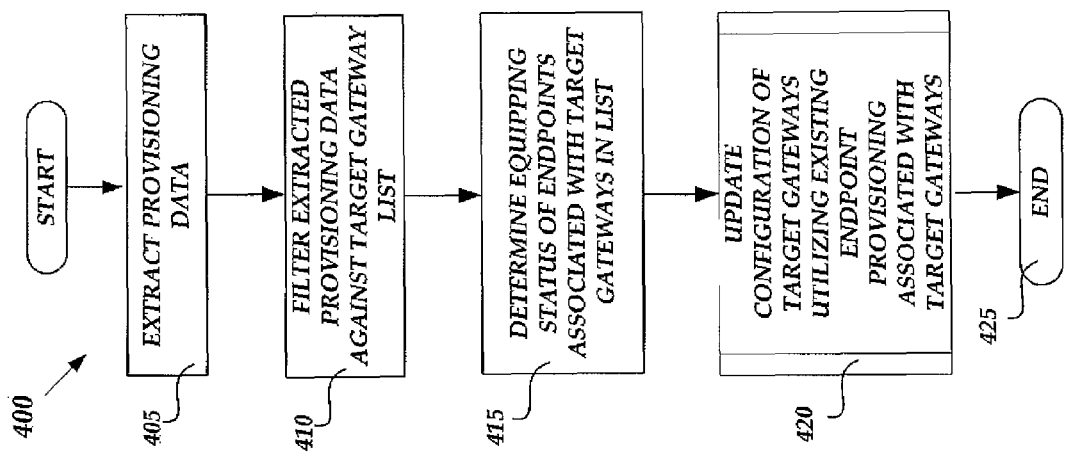
FIG. 4 is a flow diagram illustrating a routine for updating the configuration of one or more gateways, in accordance with various embodiments.

FIG. 4 is a flow diagram illustrating a routine 400 for updating the configuration of one or more gateways, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 4-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where the applications 72 executing on the computing device 70 extract provisioning data from the gateway management server 32. In particular, the applications 72 may comprise a script file which is utilized to generate the output files 74 from which contain the provisioning data extracted from the gateway management server 32. For example, a first output file in the output files 74 may comprise the gateway list with provisioning element values file 110 extracted from the provisioning elements database 34 in the gateway management server 32. Furthermore, a second output file in the output files 74 may comprise the target gateway mapping file 112 extracted from the provisioning elements database 34 in the gateway management server 32. Finally, a third output file in the output files 74 may comprise the logical group mapping file 114 extracted from the provisioning elements database 34 in the gateway management server 32. In accordance with an embodiment, the gateway list with provisioning element values file 110 may include provisioning element values associated with the maximum allowed endpoints 108 in the provisioning elements database 34. The extracted provisioning element values may include one or more Gateway Controller Name values 96, Site Name values 94 and PEP Server Name values 98.

From operation 405, the routine 400 continues to operation 410 where the applications 72 executing on the computing device 70 filter the extracted provisioning data against a target gateway list. In particular, the applications 72 may comprise a script file which is utilized to filter the provisioning data against a list of gateways in the cable services network 80 which have been designated for configuration updating by a user of the applications 72.

From operation 410, the routine 400 continues to operation 415 where the applications 72 executing on the computing device 70 determine an equipping status of endpoints associated with target gateways in the list of target gateways. In particular, the applications 72 may comprise a script file which is utilized to extract the number of endpoints for each gateway in the list, query the softswitch platform 30 for an equipped status of each endpoint, and record the results. The script file may then be utilized to identify the equipped and unequipped endpoints and label them accordingly. Target gateways which are not found in the provisioning data (i.e., the provisioning elements database 34) are marked as invalid.

From operation 415, the routine 400 continues to operation 420, where the applications 72 executing on the computing device 70 update the configuration of the target gateways utilizing existing endpoint provisioning associated with the target gateways, as will be described in greater detail below with respect to FIG. 5. From operation 420, the routine 400 then ends.

Figure 5:
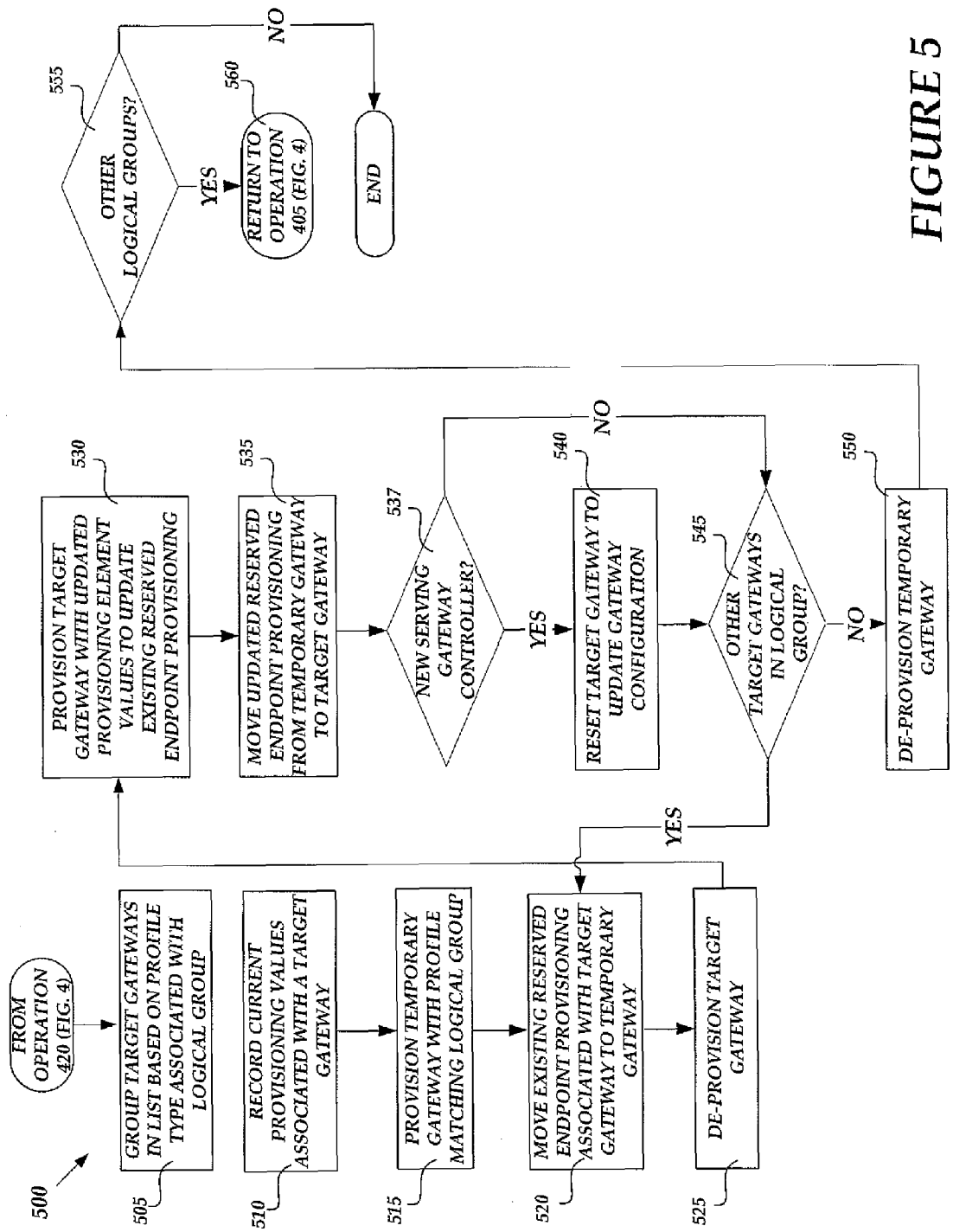
FIG. 5 is a flow diagram illustrating a routine for updating the configuration of one or more gateways, in accordance with various embodiments.

Turning now to FIG. 5, a flow diagram illustrating a routine 500 for updating the configuration of one or more gateways will now be described, in accordance with various embodiments. From operation 420, the routine 500 begins at operation 505, where the applications 72 executing on the computing device 70 groups the target gateways in the target gateway list based on a target gateway profile type. In particular, the applications 72 may comprise a script file which is utilized to group target gateways in the gateway list with provisioning element values file 110 based on the target gateway profile type.

From operation 505, the routine 500 continues to operation 510, where the applications 72 executing on the computing device 70 record current provisioning values associated with a target gateway. In particular, the applications 72 may comprise a script file which is utilized to record the provisioning element values in the gateway list with provisioning element values file 110, for a selected target gateway (i.e., one of the gateways 40 in the cable services network 80).

From operation 510, the routine 500 continues to operation 515, where the applications 72 executing on the computing device 70 provision a temporary gateway having a profile matching the logical group associated with the selected target gateway. In particular, the applications 72 may comprise a script file which is utilized to create a temporary gateway (i.e., a temporary gateway 78) having the same gateway attributes (i.e., a Site Name 94, a Gateway Controller Name 96 and a PEP Server Name 98) and profile attributes (i.e., a Name 106, a Type 102 and a Version 104) as the selected target gateway. In accordance with an embodiment, the temporary gateway may be created by creating phantom provisioning data on the selected target gateway.

From operation 515, the routine 500 continues to operation 520, where the applications 72 executing on the computing device 70 move existing endpoint provisioning with the selected target gateway to the temporary gateway created at operation 515. In particular, the applications 72 may comprise a script file which is utilized to move equipped endpoints in the maximum allowed endpoints 108 which are associated with the selected target gateway.

From operation 520, the routine 500 continues to operation 525, where the applications 72 executing on the computing device 70 de-provision the selected target gateway. In particular, the applications 72 may comprise a script file which is utilized to delete the selected target gateway from the softswitch platform 30.

From operation 525, the routine 500 continues to operation 530, where the applications 72 executing on the computing device 70 provision the selected target gateway with updated provisioning element values to update the existing endpoint provisioning associated with the selected target gateway. In particular, the applications 72 may comprise a script file which is utilized to create or add a new gateway which has updated values (relative to the de-provisioned selected target gateway) for one or more of the Site Name 94, the Gateway Controller Name 96 and the PEP Server Name 98 attributes.

From operation 530, the routine 500 continues to operation 535, where the applications 72 executing on the computing device 70 move the endpoint provisioning from the temporary gateway back to the selected target gateway. In particular, the applications 72 may comprise a script file which is utilized to move the equipped endpoints in the maximum allowed endpoints 108, which had been previously moved to the temporary gateway, back to the selected target gateway.

From operation 535, the routine 500 continues to operation 537, where the applications 72 executing on the computing device 70 determines if there are any other serving gateway controllers. If, at operation 537, it is determined there is another serving gateway controller, then the routine 500 continues operation 540. If, at operation 537, it is determined that there is not another serving gateway controller, then the routine 500 branches to operation 545.

From operation 537, the routine 500 continues to operation 540, where the applications 72 executing on the computing device 70 resets the selected target gateway to effect the updated on the gateway configuration (i.e., the updated provisioning element values). In particular, the applications 72 may comprise a script file which is utilized to reset the selected target gateway using the gateway's Media Access Control ("MAC") address. In accordance with an embodiment, the script file may be configured to make a web services call to a web service which has the log-in credentials, the reset command and the MAC address for the selected gateway. The script file may then utilize this information to send a command to the selected target gateway for resetting the gateway in real time. In accordance with an embodiment, the applications 72 may dynamically determine when to reset the selected target gateway based on the updated gateway configuration.

From operation 540, the routine 500 continues to operation 545, where the applications 72 executing on the computing device 70 determines if there are any other target gateways in the logical group associated with the previously selected target gateway. In particular, the applications 72 may comprise a script file which is utilized to make the aforementioned determination. If, at operation 545, it is determined there is another target gateway in the logical group, then the routine 500 returns to operation 520. If, at operation 545, it is determined that there are not any other target gateways in the logical group, then the routine 500 continues to operation 550.

At operation 550, the applications 72 executing on the computing device 70 de-provisions the temporary gateway. In particular, the applications 72 may comprise a script file which deletes the temporary gateway from the computing device 70.

From operation 550, the routine 500 continues to operation 555, where the applications 72 executing on the computing device 70 determines if there are any other logical groups in the softswitch platform 30. In particular, the applications 72 may comprise a script file which is utilized to make the aforementioned determination. If, at operation 550, it is determined that there are other logical groups, then the routine 500 returns to operation 405 of FIG. 4. If, at operation 545, it is determined that there are not any other logical groups, then the routine 500 ends.

Figure 6:
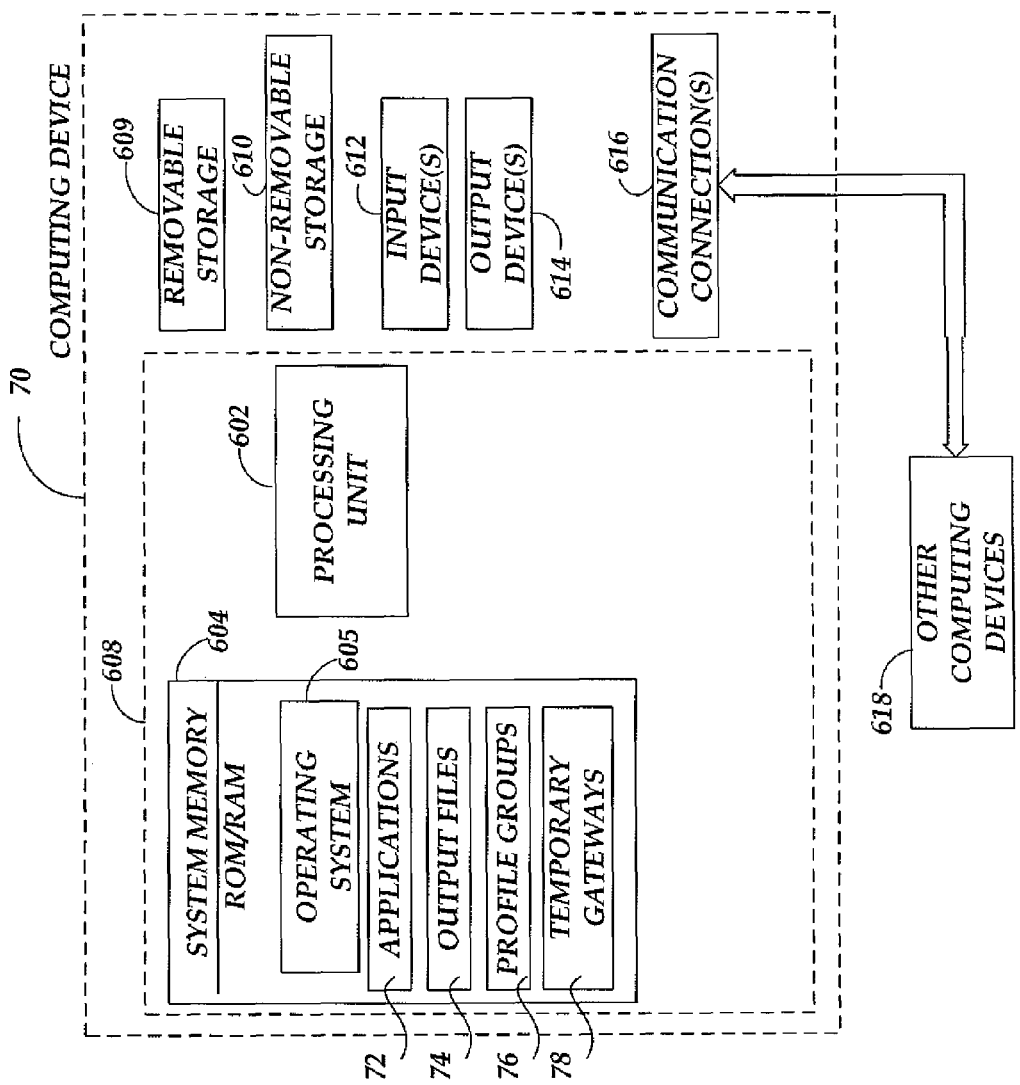
FIG. 6 is a block diagram illustrating a computing device in the network architecture of FIG. 1, which may be utilized to update the configuration of one or more gateways, in accordance with various embodiments.

FIG. 6 is a block diagram illustrating the computing device 70 in the network architecture of FIG. 1, which may be utilized to update the configuration of one or more gateways, in accordance with various embodiments. In a basic configuration, the computing device 70 may be a computer executing the applications 72 and typically including at least one processing unit 602 and system memory 604. The computing device 70 may also include a plurality of processing units that cooperate in executing programs. Depending on the exact configuration and type of computing device, the system memory 604 may be volatile (such as RAM), non-volatile (such as ROM, flash memory, etc.) or some combination of the two. The system memory 604 typically includes an operating system 605 suitable for controlling the operation of a networked personal computer. The system memory 604 may also include one or more software applications and other files and data, such as the applications 72, the output files 74, the logical groups 76 and the temporary gateways 78.

The computing device 70 may have additional features or functionality. For example, the computing device 70 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. The system memory 604, the removable storage 609 and the non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 70. Any such computer storage media may be part of the computing device 70. The computing device 70 may also have input device(s) 612 such as keyboard, mouse, pen, voice input device, touch input device, etc. Output device(s) 614 such as a display, speakers, printer, etc. may also be included. These devices are well known in the art and need not be discussed at length herein The computing device 70 may also contain communication connections 616 that allow the device to communicate with other computing devices 618, such as over a wireless or a wireline network in a distributed computing environment, for example, an intranet or the Internet. The other computing devices 618 may include the central office 60, the softswitch platform 30 and the gateway management server 32 discussed above with respect to FIG. 1. The communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method, implemented at least in part by a computing device, for updating a configuration of a gateway in a communications network, comprising:
   extracting provisioning data from a gateway management server, wherein extracting provisioning data from a gateway management server comprises:
      generating a first output file, the first output file comprising the list of gateways in the communications network and provisioning element values associated with the gateways in the list, the provisioning element values associated with the endpoints, the gateways in the list comprising the at least one target gateway;
      generating a second output file comprising a mapping of the at least one target gateway to a logical group; and
      generating a third output file comprising a mapping of the logical group to a serving gateway controller;
   filtering the extracted provisioning data against a list of gateways;
   determining an equipping status of endpoints associated with target gateways in the list;
   updating the configuration of at least one target gateway by utilizing existing endpoint provisioning associated with the at least one target gateway, wherein updating the configuration of at least one target gateway by utilizing existing endpoint provisioning associated with the at least one target gateway comprises:
      grouping the target gateways in the list based on a profile type; and
      recording current provisioning values associated with the at least one target gateway;
   provisioning a temporary gateway with a profile matching the logical group;
   moving the existing endpoint provisioning associated with the at least one target gateway to the temporary gateway;
   de-provisioning the at least one target gateway;
   provisioning the at least one target gateway with updated provisioning element values to update the existing endpoint provisioning;
   moving the updated endpoint provisioning from the temporary gateway to the at least one target gateway; and
   resetting the at least one target gateway to update the configuration.

2. The method of claim 1, further comprising:
   determining at least one other target gateway within the logical group;
   de-provisioning the temporary gateway when there is not at least one other target gateway within the logical group; and
   moving the existing endpoint provisioning associated with the at least one other target gateway to the temporary gateway when there is at least one other target gateway within the logical group.

3. The method of claim 2, further comprising:
   determining at least one other logical group; and
   provisioning a temporary gateway with a profile matching the at least one other logical group.

4. The method of claim 1, wherein generating a first output file, the first output file comprising the list of gateways in the communications network and provisioning element values associated with the gateways in the list, the provisioning element values associated with the endpoints, the gateways in the list comprising the at least one target gateway, comprises extracting at least one of a gateway controller name value, a site name value, and a policy enforcement point server name value.

5. A computing device for updating a configuration of a gateway in a communications network, comprising:
   a memory for storing executable program code; and
   a processor, functionally coupled to the memory, the processor being responsive to computer-executable instructions contained in the program code and operative to:
      extract provisioning data from a gateway management server, wherein the processor, in extracting provisioning data from a gateway management server, is further operative to:
         generate a first output file, the first output file comprising the list of gateways in the communications network and provisioning element values associated with the gateways in the list, the provisioning element values associated with the endpoints, the gateways in the list comprising the at least one target gateway;
         generate a second output file comprising a mapping of the at least one target gateway to a logical group; and
         generate a third output file comprising a mapping of the logical group to a serving gateway controller;
      filter the extracted provisioning data against a list of gateways; determine an equipping status of endpoints associated with target gateways in the list;
      update the configuration of at least one target gateway by utilizing existing endpoint provisioning associated with the at least one target gateway, wherein the processor, in updating the configuration of at least one target gateway by utilizing existing endpoint provisioning associated with the at least one target gateway, is further operative to:
         group the target gateways in the list based on a profile type; and
         record current provisioning values associated with the at least one target gateway;
      provision a temporary gateway with a profile matching the logical group; move the existing endpoint provisioning associated with the at least one target gateway to the temporary gateway;
      de-provision the at least one target gateway;
      provision the at least one target gateway with updated provisioning element values to update the existing endpoint provisioning;
      move the updated endpoint provisioning from the temporary gateway to the at least one target gateway; and
      reset the at least one target gateway to update the configuration.

6. The computing device of claim 5, wherein the processor is further operative to:

determine at least one other target gateway within the logical group;
de-provision the temporary gateway when there is not at least one other target gateway within the logical group; and
move the existing endpoint provisioning associated with the at least one other target gateway to the temporary gateway when there is at least one other target gateway within the logical group.

7. The computing device of claim 6, wherein the processor is further operative to:
determine at least one other logical group; and
provision a temporary gateway with a profile matching the at least one other logical group.

8. The computing device of claim 5, wherein the processor, in generating a first output file, the first output file comprising the list of gateways in the communications network and provisioning element values associated with the gateways in the list, the provisioning element values associated with the endpoints, the gateways in the list comprising the at least one target gateway, is further operative to extract at least one of a gateway controller name value, a site name value, and a policy enforcement point server name value.

9. A method, implemented at least in part by a computing device, for updating a configuration of a gateway in a communications network, comprising:
extracting provisioning data from a gateway management server, wherein extracting provisioning data from a gateway management server comprises:
generating a first output file, the first output file comprising a list of gateways in the communications network and provisioning element values associated with the gateways in the list, the provisioning element values associated with endpoints, the gateways in the list comprising the at least one target gateway;
generating a second output file comprising a mapping of the at least one target gateway to a logical group; and
generating a third output file comprising a mapping of the logical group to a serving gateway controller;
filtering the extracted provisioning data against the list of gateways;
determining an equipping status of the endpoints associated with the target gateways in the list;
updating the configuration of at least one target gateway by utilizing endpoint provisioning associated with the at least one target gateway, wherein updating the configuration of at least one target gateway by utilizing existing endpoint provisioning associated with the at least one target gateway comprises:
grouping the target gateways in the list based on a profile type; and
recording current provisioning values associated with the at least one target gateway;
provisioning a temporary gateway with a profile matching the logical group;
moving the existing endpoint provisioning associated with the at least one target gateway to the temporary gateway;
de-provisioning the at least one target gateway;
provisioning the at least one target gateway with updated provisioning element values to update the existing endpoint provisioning,
moving the updated endpoint provisioning from the temporary gateway to the at least one target gateway; and
resetting the at least one target gateway to update the configuration, wherein resetting the at least one target gateway to update the configuration comprises dynamically determining when to reset the at least one target gateway based on the updated provisioning element values.

10. The method of claim 9, further comprising:
determining at least one other target gateway within the logical group;
de-provisioning the temporary gateway when there is not at least one other target gateway within the logical group; and
moving the existing endpoint provisioning associated with the at least one other target gateway to the temporary gateway when there is at least one other target gateway within the logical group.

11. The method of claim 10, further comprising:
determining at least one other logical group; and
provisioning a temporary gateway with a profile matching the at least one other logical group.

12. The method of claim 9, wherein generating a first output file, the first output file comprising a list of gateways in the communications network and provisioning element values associated with the gateways in the list, the provisioning element values associated with the endpoints, the gateways in the list comprising the at least one target gateway, comprises extracting at least one of a gateway controller name value, a site name value, and a policy enforcement point server name value.

* * * * *